United States Patent
Dube et al.

(10) Patent No.: US 7,466,656 B2
(45) Date of Patent: Dec. 16, 2008

(54) METHOD, APPARATUS AND PROGRAM STORAGE DEVICE FOR EFFICIENT CONSTRUCTION OF NETWORK OVERLAYS THROUGH INTERCONNECTION TOPOLOGY EMBEDDING

(75) Inventors: Parijat Dube, Hicksville, NY (US); Zhen Liu, Tarrytown, NY (US); Dimitrios Pendarakis, Westport, CT (US); George V. Popescu, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 10/973,329

(22) Filed: Oct. 26, 2004

(65) Prior Publication Data
US 2006/0087986 A1   Apr. 27, 2006

(51) Int. Cl.
*H04L 12/26* (2006.01)
(52) U.S. Cl. .............. 370/244; 370/254; 370/464; 709/220; 709/223
(58) Field of Classification Search ............... None
See application file for complete search history.

(56) References Cited

U.S. PATENT DOCUMENTS

| | | | |
|---|---|---|---|
| 6,856,991 B1* | 2/2005 | Srivastava | 707/10 |
| 6,910,069 B1* | 6/2005 | Holt et al. | 709/221 |
| 6,920,497 B1* | 7/2005 | Bourassa et al. | 709/227 |
| 2005/0083848 A1* | 4/2005 | Shao et al. | 370/238 |
| 2005/0201405 A1* | 9/2005 | Liu et al. | 370/432 |
| 2005/0243722 A1* | 11/2005 | Liu et al. | 370/235 |
| 2005/0281204 A1* | 12/2005 | Karol et al. | 370/248 |
| 2006/0053163 A1 | 3/2006 | Liu et al. | |
| 2007/0263553 A1* | 11/2007 | Bharali et al. | 370/254 |

OTHER PUBLICATIONS

Interconnection Topologies and Routing for Parallel Processing Systems, Kotsis, G., ACPC Tr 92-19, 1992.
Topological properties of the Hypercubes, Y. Saad, M. Schultz, IEEE Transaction on Computers, vol. 37, No. 7, Jul. 1988.
Introduction to Parallel Algorithms and Architectures: Arrays, Trees, and Hypercubes, F. T. Leighton, Morgan Kaufman, 1992 (background reference only).
I. Stoica, R. Morris, D. Karger, F. Kaashoek, and H. Balakrishnan, "Chord: A Scalable Peer-to-Peer Lookup Service for Internet Applications," in proceedings of the ACM SIGCOMM 2001 Technical Conference, San Diego, CA, USA, Sep. 2001.
S. Ratnasamy, P. Francis, M. Handley, R. Karp, and S. Shenker, "A scalable content addressable network" In Proc ACM SIGCOMM, pp. 161-172, 2001.

* cited by examiner

*Primary Examiner*—Chi H. Pham
*Assistant Examiner*—Soon D. Hyun
(74) *Attorney, Agent, or Firm*—Ference & Associates LLC

(57) ABSTRACT

Methods, apparatuses and program storage devices for constructing a network overlay via embedding an interconnection network in a network overlay graph are provided herein. The network delay distances between pairs of overlay nodes are measured on the shortest network paths. The mapping of the interconnection topology to the network overlay nodes preferably involves assigning $2^m$ m-length binary indexes to the network overlay nodes. There is proposed herein a polynomial time algorithm for interconnection topology embedding using iterative cluster division and node binary index assignment. There is further proposed herein a method for construction of network overlays through interconnection network topology embedding, with the objective of optimizing a quality of service metric (e.g. minimization of the average network overlay routing delay).

17 Claims, 3 Drawing Sheets

Landmarks
Peer-to-peer measurements

Measurement Infrastructure

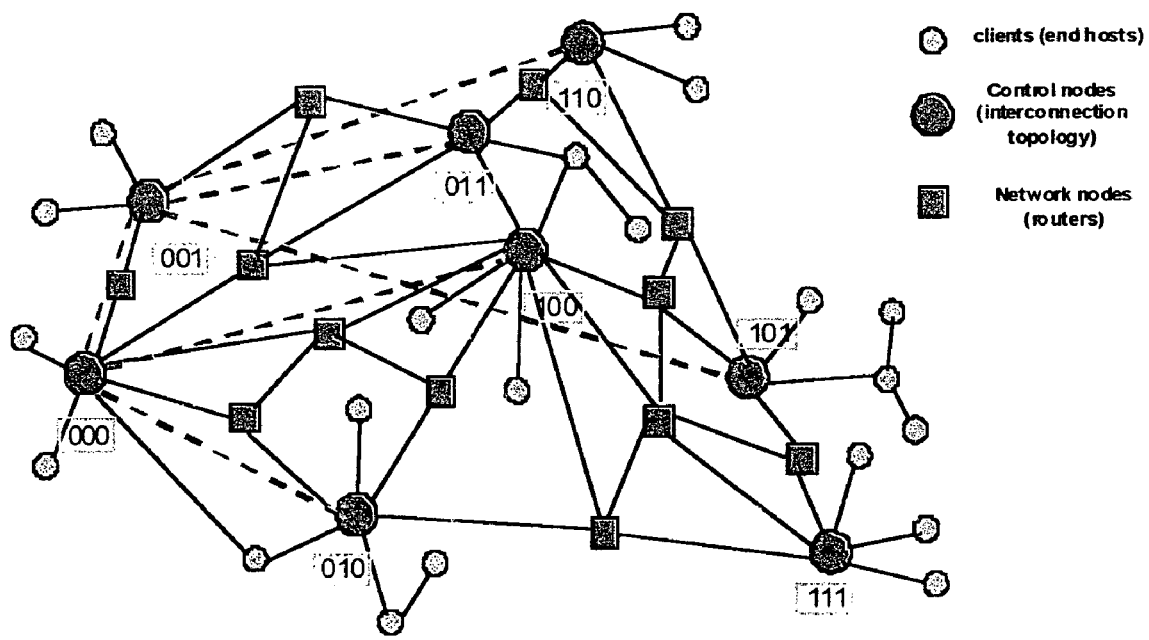
Figure 1 : Overlay construction using network node indexing

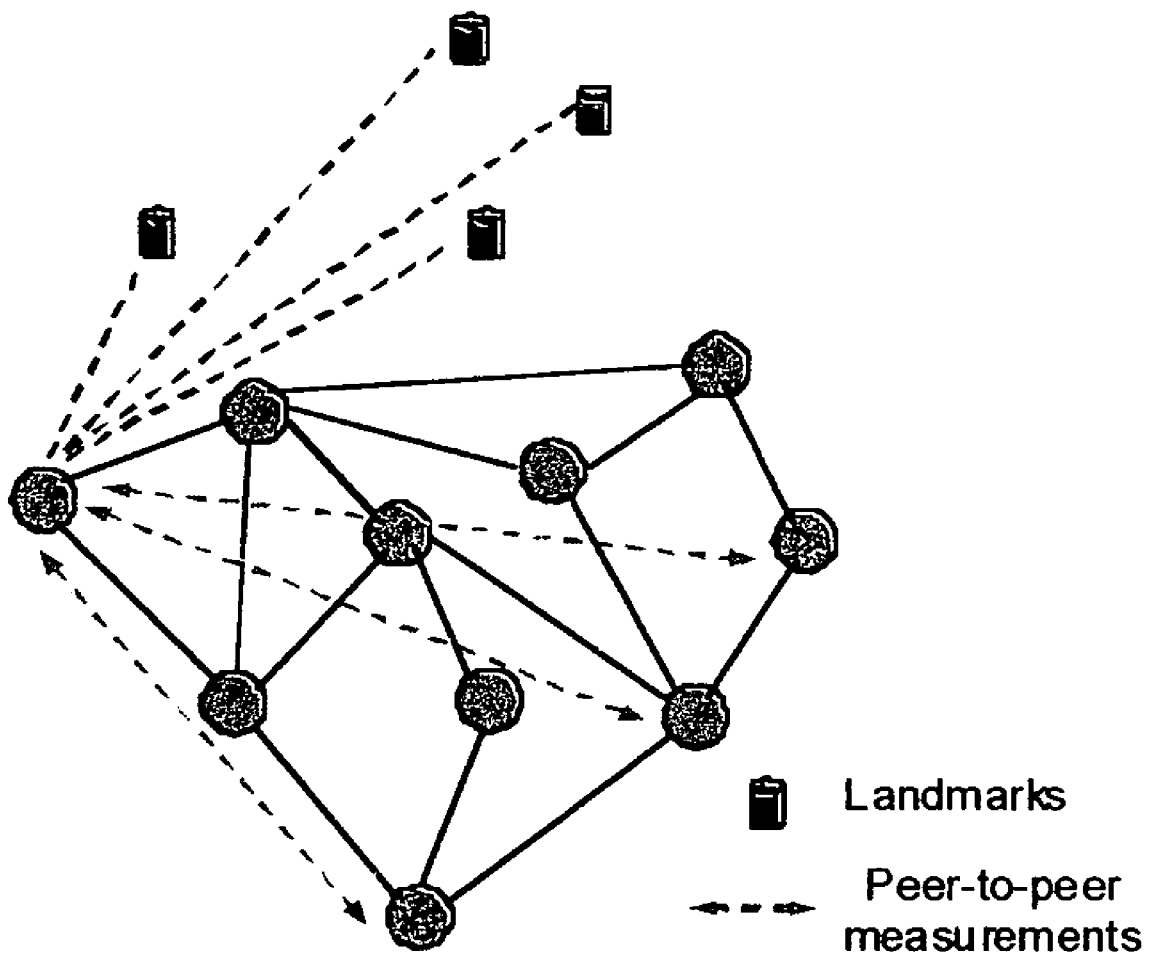
Figure 2 : Measurement Infrastructure

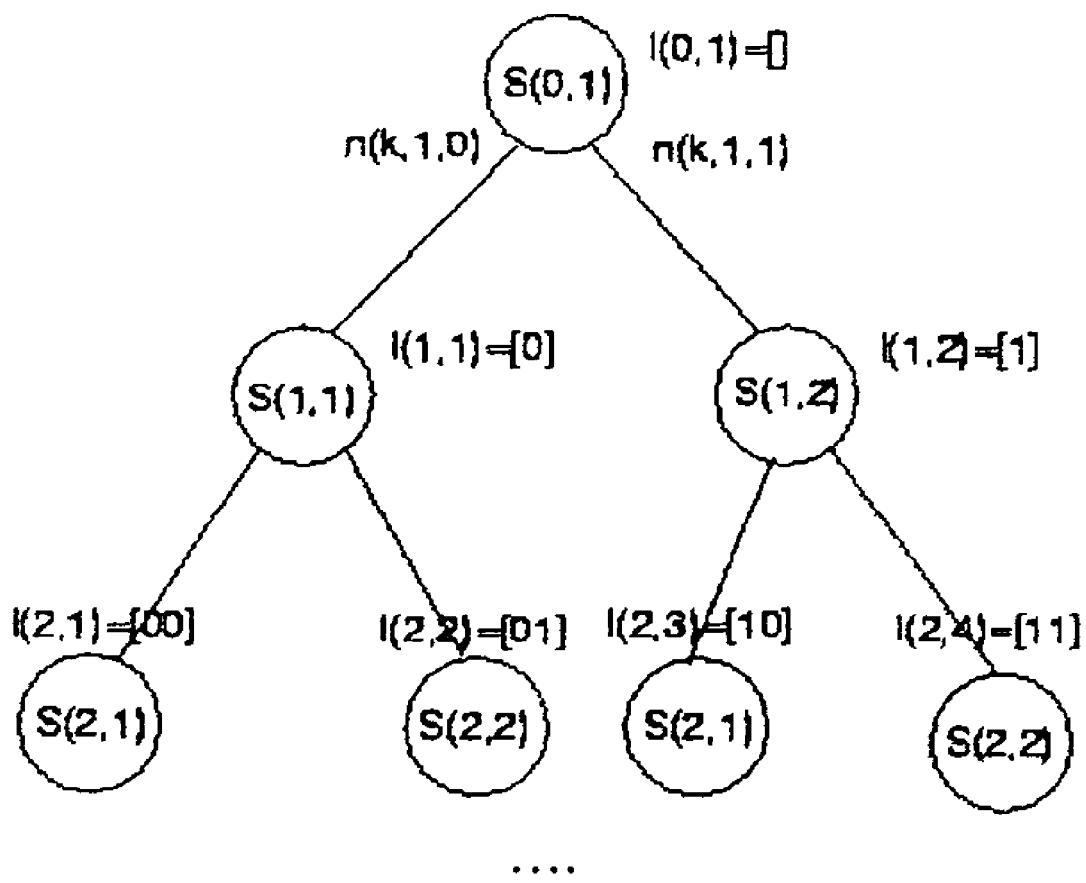
Figure 3: Iterative index construction algorithm

METHOD, APPARATUS AND PROGRAM STORAGE DEVICE FOR EFFICIENT CONSTRUCTION OF NETWORK OVERLAYS THROUGH INTERCONNECTION TOPOLOGY EMBEDDING

FIELD OF THE INVENTION

The present invention relates generally to the construction of network overlays, and related arrangements.

BACKGROUND OF THE INVENTION

Throughout the instant disclosure, numerals in brackets—[ ]—are keyed to the list of numbered references towards the end of the disclosure.

Scalable and robust distributed data dissemination requires scalable control networks to efficiently handle control information. Distributed data indexing techniques normally partition the data index set, and assign partitions to a set of nodes distributed across a network. Examples of applications which use distributed data indexing are: distributed directories, content distribution networks and web caching.

Overlay networks provide application level data routing and control functionality needed to support distributed data indexing. Overlays have the advantage of higher manageability and adaptability required by applications which require dynamic scaling of distributed data; they can be more efficient for applications with such dynamics despite the overhead introduced by providing network functionality at the application level.

Several interconnection topologies have scalability and resiliency properties required to support distributed data indexing. While designed primarily for parallel computing systems, interconnection topologies can be used as routing networks by providing an efficient mapping of the interconnection topology to the network overlay. After overlay construction, a distributed hashing method assigns keys to network overlay nodes so as to optimize the computation and communication cost for data retrieval. Typical metrics used for optimal distribution of data indexes are: average key look-up delay, the average forwarding overhead of look-up queries, etc.

An application of distributed hashing is scalable control of group communication. The control topology for scalable group communication has several desirable properties: the control node degree (number of connections per control node) grows logarithmically with the size of the control topology, the average number of hops required to locate any item (communication group) is logarithmic with the size of the network, per node control overhead is load balanced and the overhead of control topology dynamics scale with the logarithm of its size. Historical methods of constructing network overlays for distributed indexing applications do not optimize network quality of service metrics; the overhead metric is computed as the average number of hops required for key look-up, regardless of the network delay. The routing cost on the underlying network can be quite large if the topology of the constructed overlay network is not correlated with the underlying network distances. By providing an optimal (delay minimized) configuration of the network overlay, the quality of service offered to delay sensitive distributed indexing applications is substantially increased.

Several methods of constructing overlay topologies for distributed indexing applications have been proposed recently: Chord, Can, hypercube, and deBruijn structures etc. [6,7]. Each of these exhibits a subset of the features mentioned above. However, the construction of network overlay for the above DHT's does not take into account the quality of the service offered by the underlying network to the distributed indexing application.

In view of the foregoing, an evolving need has been recognized in connection with improving upon the shortcomings and disadvantages encountered in historical efforts towards distributed data dissemination and indexing.

SUMMARY OF THE INVENTION

There is broadly contemplated herein, in accordance with at least one presently preferred embodiment of the present invention, a method, apparatus and program storage device for constructing network overlay by embedding an interconnection network in a network overlay graph. Presented herein is one example of an approximation algorithm for efficient mapping of hypercube topology on a network overlay of N nodes such that the average network delay distance measured on the network overlay is minimized. The network delay distances between pairs of overlay nodes are measured on the shortest network paths. The mapping of the interconnection topology to the network overlay nodes preferably involves assigning $2^m$ m-length binary indexes to the network overlay nodes. There is proposed herein a polynomial time algorithm for interconnection topology embedding using iterative cluster division and node binary index assignment.

There is further proposed herein a method for construction of network overlays through interconnection network topology embedding, with the objective of optimizing a quality of service metric (e.g. minimization of the average network overlay routing delay).

In summary, one aspect of the invention provides a method of facilitating network overlay construction, the method comprising the steps of: providing a network overlay graph; and embedding an interconnection network in the network overlay graph.

Another aspect of the invention provides an apparatus for facilitating network overlay construction, the apparatus comprising: an arrangement for providing a network overlay graph; and an arrangement for embedding an interconnection network in the network overlay graph.

Furthermore, an additional aspect of the invention provides a program storage device readable by machine, tangibly embodying a program of instructions executable by the machine to perform method steps for facilitating network overlay construction, the method comprising the steps of: providing a network overlay graph; and embedding an interconnection network in the network overlay graph.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 schematically illustrates overlay construction using network node indexing.

FIG. 2 schematically illustrates a measurement infrastructure.

FIG. 3 schematically illustrates an iterative index construction algorithm.

DESCRIPTION OF THE PREFERRED EMBODIMENTS

There is broadly contemplated herein, in accordance with at least one presently preferred embodiment of the present invention, a method for the efficient construction of a network overlay by embedding an interconnection network. An sample network depicting a possible application is shown in FIG. 1, which illustrates a physical network with clients (end hosts) and control nodes interconnected by physical links and network nodes (routers). The objective here to interconnect the control nodes in an efficient control topology that minimizes search delay. Presented herebelow is an approximation algorithm for the efficient embedding of a hypercube topology in a network overlay of N nodes such that the average network delay distance measured on the network overlay is minimized. The network information (delay between pairs of network nodes measured on the shortest network paths) is collected at network overlay control nodes. The embedding of interconnection topology consists of assigning of $2^m$ m-length binary indices to each of the network overlay nodes. We describe a polynomial time algorithm for interconnection topology embedding through overlay network cluster indexing.

Also presented herebelow is a method for distributed construction of network overlay. Each node receives the IP addresses of its overlay topology neighbors and their associated indices. Each overlay node open network connections to its overlay neighbors. Subsequently, each node constructs a routing table with overlay neighbor network addresses and their assigned indices.

Turning first to network measurement collection for optimal interconnection graph embedding, this phase involves the collection of a set of network-wide measurements that are used to assign a metric to each link of the overlay network. Broadly contemplated herein is the use of delay measurements, thus resulting in a set of pair-wise network delay measurements. However, any other set of network measurements, such as available throughput or loss rate, could also be used.

Two sets of mechanisms that can be used to collect the network delay measurements are presented next.

One set of such mechanisms involves delay measurements against "landmark" nodes. This approach, also known in the literature as Global Network Positioning (GNP), relies on a small set of reference nodes that are distributed over a large geographic area. Network nodes perform roundtrip delay measurements to all landmarks and then use a transformation of the vector of these delays to produce Euclidean coordinates (see FIG. 2). These coordinates are collected at controller nodes executing an embedding method according to at least one embodiment of the present invention. As the network is iteratively partitioned, the coordinates of the nodes within a partition are collected at each partition controller. The benefit of the landmark approach is that, for N nodes and K landmarks, it requires N*K delay measurements. For the typical case of N>>K, this substantially reduces the number of measurements compared to the "peer-to-peer" approach. However, it relies on the selection of appropriate landmarks, which can be a challenge.

Another set of mechanisms involves "peer-to-peer" measurements. In this approach, every node performs a roundtrip delay measurement against all other nodes (see FIG. 2). Reduction techniques can also be utilized to measure delay against a subset of all the other nodes. These measurements are collected at controller nodes, which directly use them in our method, as distances between nodes. The collection of measurements proceeds iteratively, just as in the case of landmark-based measurements.

In accordance with a subsequent step of a method according to at least one embodiment of the present invention, after collection of the measurements there is created a data structure to maintain the network measurement information. The network delay information collected at a control node is recorded in a data structure that indexes the delay between pairs of nodes by the network node labels. An example of a data structure for recording the network delay information is a matrix of size N with row/column with indices corresponding to the network graph nodes labels. Each entry in the matrix corresponds to the network delay between the network node with the label corresponding to the row index and the network node with the label corresponding to the column index.

Bandwidth and network loss are recorded similarly in network information matrix structures. Node overlay data such as maximum node forwarding capacity is recorded in a list with entries of form (node label, node forward capacity).

Turning to network aware overlay topology construction, it should be recognized that an important objective of optimal network overlay topology construction is the minimization of the average network delay between overlay nodes. Minimizing the average delay results in better utilization of the underlying network infrastructure and in smaller end-to-end network delays between network overlay nodes. We formulate herebelow the problem of optimal embedding of an interconnection topology on a network graph.

The information needed for overlay construction is the set network delay between any two network nodes. The interconnection topology is an undirected graph G=(V,E) that satisfies structural constraints. The optimal mapping problem consists of associating each vertex of the interconnection topology graph with a network overlay node such that to minimize the objective function (e.g. the average network delay).

Given a set of nodes N(i),i=0 . . . N−1, each with an associated network space vector, the construction of an optimal network overlay consists in finding the embedding of the interconnection topology which minimizes the sum of the network delays (edge weights) of interconnection network graph.

For the hypercube interconnection network, the optimal topology embedding consists in finding an indexing of the network nodes (a mapping between the indices of the interconnection graph and the network overlay nodes) that minimizes:, $d_H(I(i),I(j))=1$, where $d_H(I(i),I(j))$ is the Hamming distance between the indices corresponding to nodes N(i) and N(j).

The mapping of an interconnection topology of $N=2^m$ nodes involves assigning $2^m$ m-length binary indexes to network overlay node N(i),i=1 . . . N. Let I(i) be the index assigned to the node N(i). A mapping algorithm assigns a binary index from the set {I(i),i=1 . . . $2^m$} to each of the overlay nodes {N(j),j=1 . . . N}. The optimal mapping of interconnection topology to the network overlay minimizes the sum of all interconnection topology edges. Proposed herebelow is a polynomial time algorithm for embedding a hypercube topology in a network overlay. The algorithm uses iterative cluster indexing of network overlay nodes.

Generally, a main idea of such an algorithm, in accordance with at least one embodiment of the present invention, is to map sets of hypercube nodes with identical prefixes to clusters (using a network delay distance) of network nodes. Each cluster contains the hypercube nodes with an identical prefix. According to [4], there are exactly $2^k$ edges between two sets of hypercube nodes of cardinality $2^k$ whose indices differ in the last bit of the (m–k) bit cluster prefix. Therefore assigning index prefixes to clusters of $2^k$ nodes eliminate $2^k$ ($2^k$–1) edges. The hypercube embedding algorithm greedily maximizes at each step the sum of network overlay edges weights (network delays) eliminated by cluster indexing.

Preferably, there is undertaken the iterative splitting of subsets of nodes such that the sum of eliminated edge weights of a complete network graph is maximized. Each split preferably divides the current overlay node set into two subsets with equal cardinality. The splitting is performed along the principal axis of the set of nodes being split. The principal axis is obtained by locally transforming the coordinates of the nodes in the set using a PCA transform. The splitting is repeated until reaching sets of cardinality one. The node indexes are constructed by assigning indexes of variable length for each set; the set index has length j, after j splits. The set index is extended with one bit after each split, following the proximity rule: if both cluster centers are on the same side of the parent cluster principal axis, the subset containing the parent cluster diagonal nodes are extended with the same bit; otherwise, the clusters are extended with complementary bits. The set that contains the diagonal node of a parent set with index extension '0' is extended with the same bit.

The process of node set split and index extension is shown in FIG. 1. At each level j of the index construction tree, there are sets, each with an index of length j. The tree leaf nodes are the hypercube topology nodes. Each leaf node is connected to k other nodes, which are leafs on k parallel tree paths. A set at level j is split into two children subsets, each containing half of the nodes of the parent set. The children indexes are extended using the rule presented above, using only the position of the parent set center and its sibling relative to the principal axis.

Presented in Table 1 (below) is an algorithm for hypercube interconnection topology embedding in a network overlay using cluster indexing.

Table 1: Cluster Indexing for Hypercube Embedding 1.1 Cluster Indexing

I. Iterative Index Construction:
  1. Start with all nodes in set, and with null index level,
  2. Split each of the sets S(k–j,m), at level (the level indicates the number of splits) in two subsets of equal cardinality:, as follows:
    Perform a PCA transform on the set.
    Select the largest distance $$\max_{0 \le o < p < 2^{k-j}, n_o, n_p \in S(k-j,m)} \{d(n_o, n_p)\}$$

between any pair of nodes along the principal axis; the nodes $n_{j,m,0}$ and $n_{j,m,1}$ (diagonal nodes) correspond to the largest distance on the principal axis among the nodes in set;
    Split the set S(k–j,m) into two sub-sets of equal cardinality, such that contain $n_{j,m,0}$ and contain $n_{j,m,1}$—see splitting algorithm.
  3. Index extension:
  Increment indexes I(k–j,m), of each of the $2^j$ parents at level j as follows:
    Let the diagonal nodes of the parent set of the sibling set S(k–j,m) and S(k–j,m+1), be $n_{j-1,\lceil m/2 \rceil,0}$ and and the corresponding index extensions $I_0(k-j,\lceil m/2 \rceil)$ and. Let be the vector of the principal axis of S(k–j,m).

Compute $\vec{u}_1 = \vec{c}_{j,m} \times (\vec{n}_{j-1,\lceil m/2 \rceil,0} - \vec{n}_{j-1,\lceil m/2 \rceil,1})$ and $1/2 *$ if $(S(k - j + 1, 2*m - 1) \subset n_{j-1,\lceil m/2 \rceil,0})$ $I(k - j + 1, 2*m - 1) =, =$ else $I(k - j + 1, 2*m - 1) =, I(k - j + 1, 2*m) =$ if $((\text{f\_sign} < 0.5 \&\& S(k - j + 1, 2*m + 1) \subset n_{j-1,\lceil m/2 \rceil,1})$ $\|(\text{f\_sign} < 0.5 \&\& S(k - j + 1, 2*m + 1) \not\subset n_{j-1,\lceil m/2 \rceil,1})) =$ $I_0(k - j, m + 1), = I_1(k - j, m + 1)$ else $I(k - j + 1, 2*m + 1) =, =.$ 4. If, iterate the splitting from 1.

1.2 Overlay Node Splitting

II Set splitting:
  Split set of cardinality $2^{k-j}$ with the diagonal nodes $n_{j,m,0}$ and into subsets,:
  for (i=0; i<$2^{k-j}$; i++)
  if ((&& card( )<)||(card( )==))
  add to;
  else
  add to;

Presented in Table 2 (below) is an algorithm for hypercube interconnection topology embedding in a network overlay using cluster indexing. After index assignment, the network overlay topology is constructed according to the interconnection network connectivity rules. The method of overlay construction for a hypercube topology is thus preferably as follows:

TABLE 2

Method for distributed network overlay construction

1. Each network overlay nodes receives the set network addresses and indexes of its direct neighbors in the interconnection topology (the nodes at distance Hamming one in the interconnection topology). The node N(i) has the corresponding IP address IP(i) and the assigned index computed as in the previous section I(i).
for(i=0; i<N; i++)
{
  Index_list=I(i);
  for (j=0; j<N; j++)
  { if (distanceHamming(I(i), I(j)) = =1)
  insert (IP(j), I(j), Index_list);
  }
  Send (IP(i), Index_list);
}
2. Next each node N(i) of the network overlay establishes connections to its neighbors with a greater index (to avoid duplicating network connections).
While((j =0 ; j < size(Index_list); j++) && (I(j) > I(i)))
{
openConnection(IP(j));
}
3. Each network node creates a routing table containing the application indexes of the neighbor nodes and their IP addresses; the construction of the routing tables is described below.

The hypercube embedding algorithm presented herebelow can be parallelized easily. Construction of the network overlay through graph embedding can be distributed to a set of $2^k$ control nodes, each constructing an overlay of size $2^p$ (p=m−k) for a cluster of network nodes. The $2^k$ sets of indices corresponding to hypercube nodes with identical prefixes are distributed to each controller prior to overlay construction.

Preferably, as shown in Table 3, the steps of the algorithm for distributed network overlay construction are:

TABLE 3

Distributed hypercube embedding algorithm

1. Cluster the network overlay nodes using network delay in $2^k$ clusters of cardinality < $2^p$
2. Collect network measurements at each of the at $2^k$ cluster controller overlay nodes;
3. Distribute sets of $2^p$ indices with identical prefix to each overlay controller
4. Construct the overlay by embedding hypercubes of size $2^p$ at each overlay controller The distributed network overlay construction proceeds then to the distributed construction of the overlay following similar steps as in Table 4 (below). Each overlay The distributed network overlay construction proceeds then to the distributed construction of the overlay following similar steps as in Table 4 (below). Each overlay node has p neighbors in its cluster and one neighbor in each of the $2^k$ clusters; computation of neighbor nodes require first the distribution of the mappings computed at each overlay controller followed by distributed computation of adjacent sets of the clustered overlay nodes at each controller. The steps of distributed construction of the network overlay are presented in Table 4.

TABLE 4

Network overlay construction for distributed hypercube embedding

1. Compute the sets of adjacent nodes for each of the network overlay nodes:
   a. each of the $2^p$ overlay controllers broadcast its mapping of hypercube network indices to the all controllers;
   b. each controller computes the adjacency sets of (IPaddress, index) pairs for each overlay node in its cluster;
   c. each controller sends the set of (IPaddress, index) pairs to each overlay node in the cluster.
2. Each overlay node open network connection to all overlay nodes in its adjacency set;
3. Each overlay node create routing table from its adjacency set.

Nodes participating in distributed construction of the embedded hypercube will need to implement a communication protocol to exchange measurements, select neighbors and initiate and accept connections to these neighbors. The protocol will preferably support the following operations, corresponding to different message types:

A control node instructs other nodes to perform delay measurement against a set of potential neighbors. The messages will contain the set of other nodes (and potentially the type of measurements to be conducted).

Nodes report (delay) measurements to a control node. The message includes the measured delay for each target node.

A control node assigns a hypercube index to a node and provides the addresses of its neighbors.

A node requests establishing an adjacency in the hypercube from another node.

The protocol will also preferably include messages for establishing connectivity with the control node, authenticating the connecting and control node, reporting error conditions and reestablishing connectivity in case it is lost.

Generally, distributed indexing applications require network overlays that route data packets based on a set of indices included in the application level header. To abstract network overlay management from application data routing, overlay nodes create routing tables that address network nodes by their assigned indices (e.g. hypercube network indices). The network indices are then used by application to look-up/retrieve data items/objects. A local indexing of application identifiers distributed to adjacent overlay nodes is created and managed locally at each network overlay node. Presented herebelow are methods of creating routing tables for index-based application level routing.

1. Creation and Management of Routing Tables.

This involves creating table look-ups at each network overlay node from the adjacency set containing pairs of overlay network nodes indices and their IP addresses. The tables are preferably managed locally by each overlay node. Changes in the mapping of hypercube indices to network overlay nodes due to additions of network nodes, removal of nodes or re-assignment of indices are distributed to the overlay nodes whose adjacency sets are modified; each overlay node apply the changes to its local table without requiring any changes in the application level headers used to route data packets.

2. Creating Application Level Routing Indexing Structures from Adjacency Sets and Application Object Indices.

Application level routing (ALR) preferably involves routing messages based on application indices contained in a message header. Each application object is assigned an identifier and multiple descriptors. The distributed routing index structure is computed from application object indices and overlay node adjacency sets. The construction of ALR index structure preferably involves:

1. partitioning the set of application object identifiers by clustering of objects such that to maximize the similarity of object descriptors in the same partition;

2. mapping of partitions to indexed network nodes with the objective of minimizing the total message routing overhead.

3. construction of ALR index structures at each network overlay node [2].

The address of next hop network nodes is obtained by querying the hierarchical index using the descriptors contained in the message header; the result of the query is a set of next hop network node indices. The network node addresses are obtained by looking-up network indices in the routing table. Finally, the data is preferably forwarded to each of the network addresses outputted by routing table look-up.

An overlay constructed in accordance with the foregoing provides an efficient network infrastructure for control of large-scale group communication [3], content distribution networks, and publish-subscribe systems. The network overlay nodes are identified by their assigned indices (e.g. the hypercube indices assigned in the overlay construction method proposed here).

In large-scale group communication, each communication group is assigned an identifier and a set of communication interest descriptors (which describe the aggregate communication interest of clients in the group). Communication control information is distributed to a network of controllers managing group communication. Control messages are routed in the control overlay network based on communication interest descriptors included in application level headers.

Real-time group communication constraints require a control overlay network with minimal routing delay.

In content distribution networks, the application objects (data files) are assigned object identifiers and a set of content descriptors. The objects identifiers are partitioned into subsets assigned to network overlay nodes and the objects (files) replicated at the assigned network overlay nodes. The objects are look-ed up by querying the object location using either object identifiers or object descriptors. The message containing the query is routed in the network overlay by querying the ALR indexing structure at each node to obtain the addresses of next hop nodes.

In publish-subscribe systems, messaging is controlled by a set of brokers networked at the application level. Client subscriptions consist of a set of topics of interest and their qualifiers. The messages sent by publishers include the topic and a set of qualifiers with the published data. The brokers find the subset of clients with matching subscription interest to the published data. Messages are "filtered" at the application level before being forwarded—i.e. the set of next hop nodes are computed at each broker by matching the published data descriptor with client subscriptions. The broker network can be constructed such that to minimize the average message routing delay using the interconnection topology embedding method described in this invention.

In brief recapitulation, there is broadly contemplated herein, in accordance with at least one preferred embodiment of the present invention, a method for the collection of network information for network overlay construction using graph embedding which involves: the collection of network measurement data at multiple overlay control nodes; and the creation of a network measurement data structure.

Also broadly contemplated herein is a method of modeling network overlay construction using graph embedding which involves: modeling the overlay as a complete network graph with edge weights representing network measurement data (delay between pairs of network nodes); modeling network overlay construction as the embedding of a hypercube interconnection network graph in the network overlay graph; and assigning interconnection network graph indices to network overlay nodes such that an objective function (e.g. the average delay of network overlay with interconnection graph structure) is minimized.

Further, there is broadly contemplated herein a method of distributed construction of network overlays which involves: selecting the network addresses corresponding to adjacent nodes of the network overlay structure; distributing the set of adjacent network node addresses and the corresponding indices to each network overlay node; opening network connections to network nodes in the adjacent set; and building routing tables at each network overlay node.

It is to be understood that the present invention, in accordance with at least one presently preferred embodiment, includes an arrangement for providing a network overlay graph and an arrangement for embedding an interconnection network in the network overlay graph . . . Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[1] "Interconnection Topologies and Routing for Parallel Processing Systems", Kotsis, G, ACPC TR 92-19, 1992.
[2] G. Popescu, Z. Liu; "Hierarchical space partitioning for scalable data dissemination in large-scale distributed interactive applications". U.S. patent application Ser. No. 10/933,800, filed Sep. 3, 2004.
[3] "Topological properties of the Hypercubes", Y. Saad, M. Schultz, IEEE Transaction on Computers, Vol. 37, No. 7., July, 1988.
[4] I. Stoica, R. Morris, D. Karger, F. Kaashoek, and H. Balakrishnan, "Chord: A Scalable Peer-to-peer Lookup Service for Internet Applications," In Proceedings of the ACM SIGCOMM 2001 Technical Conference, San Diego, Calif., USA, September 2001.
[5] S. Ratnasamy, P. Francis, M. Handley, R. Karp, and S. Shenker, "A scalable content addressable network" In Proc ACM SIGCOMM, pages 161-172, 2001.

What is claimed is:

1. A method of facilitating network overlay construction, said method comprising the steps of:
    providing a network overlay graph;
    embedding an interconnection network in the network overlay graph;
    modeling network overlay construction;
    said step of providing a network overlay graph comprises providing a complete network overlay graph which includes nodes and edge weights, the edge weights representing network measurement data;
    said embedding step comprising embedding a hypercube interconnection network graph in the network overlay graph; and
    assigning interconnection indices to the nodes such that an objective function is minimized.

2. The method according to claim 1, further comprising the steps of:
    designating multiple overlay control nodes in the network overlay graph;
    collecting network measurement data at the multiple overlay control nodes; and
    creating a network measurement data structure.

3. The method according to claim 1, wherein the network measurement data comprises delay between pairs of network nodes.

4. The method according to claim 1, wherein the objective function comprises the average delay of network overlay within the hypercube interconnection network graph.

5. The method according to claim 1, wherein said embedding step comprises assigning $2^m$ m-length binary indices to the nodes.

6. The method according to claim 1, wherein said embedding step comprises employing a polynomial time algorithm.

7. The method according to claim 6, wherein the polynomial time algorithm employs at least one of: iterative cluster division and node binary index assignment.

8. The method according to claim 1, wherein:
said step of providing a network overlay structure comprises providing nodes, each node including a node address and node index; and
said method further comprises:
selecting network node addresses and associated node indices corresponding to adjacent nodes in the network overlay structure;
distributing the selected network node addresses and associated indices to each node;
opening network connections to nodes corresponding to the selected addresses and indices; and
building at least one corresponding routing table at each node.

9. An apparatus for facilitating network overlay construction, said apparatus comprising:
an arrangement for providing a network overlay graph;
an arrangement for embedding an interconnection network in the network overlay graph;
an arrangement for modeling network overlay construction;
the network overlay graph comprising a complete network overlay graph which includes nodes and edge weights, the edge weights representing network measurement data;
said arrangement for embedding to embed a hypercube interconnection network graph in the network overlay graph; and
an arrangement for assigning interconnection indices to the nodes such that an objective function is minimized.

10. The apparatus according to claim 9, wherein multiple overlay control nodes are designated in the network overlay graph, said apparatus further comprising:
an arrangement for collecting network measurement data at the multiple overlay control nodes; and
an arrangement for creating a network measurement data structure.

11. The apparatus according to claim 9, wherein the network measurement data comprises delay between pairs of network nodes.

12. The apparatus according to claim 9, wherein the objective function comprises the average delay of network overlay within the hypercube interconnection network graph.

13. The apparatus according to claim 9, wherein said embedding arrangement is adapted to assign $2^m$ m-length binary indices to the nodes.

14. The apparatus according to claim 9, wherein said embedding arrangement employs a polynomial time algorithm.

15. The apparatus according to claim 14, wherein the polynomial time algorithm employs at least one of: iterative cluster division and node binary index assignment.

16. The apparatus according to claim 9, wherein the network overlay structure comprises nodes, each node including a node address and node index, said apparatus further comprising:
an arrangement for selecting network node addresses and associated node indices corresponding to adjacent nodes in the network overlay structure;
an arrangement for distributing the selected network node addresses and associated indices to each node;
an arrangement for opening network connections to nodes corresponding to the selected addresses and indices; and
an arrangement for building at least one corresponding routing table at each node.

17. A program storage device readable by machine, tangibly embodying a program of instructions executable by the machine to perform method steps for facilitating network overlay construction, said method comprising the steps of:
providing a network overlay graph;
embedding an interconnection network in the network overlay graph;
modeling network overlay construction;
said step of providing a network overlay graph comprises providing a complete network overlay graph which includes nodes and edge weights, the edge weights representing network measurement data;
said embedding step comprising embedding a hypercube interconnection network graph in the network overlay graph; and
assigning interconnection indices to the nodes such that an objective function is minimized.

* * * * *